Figure 1:
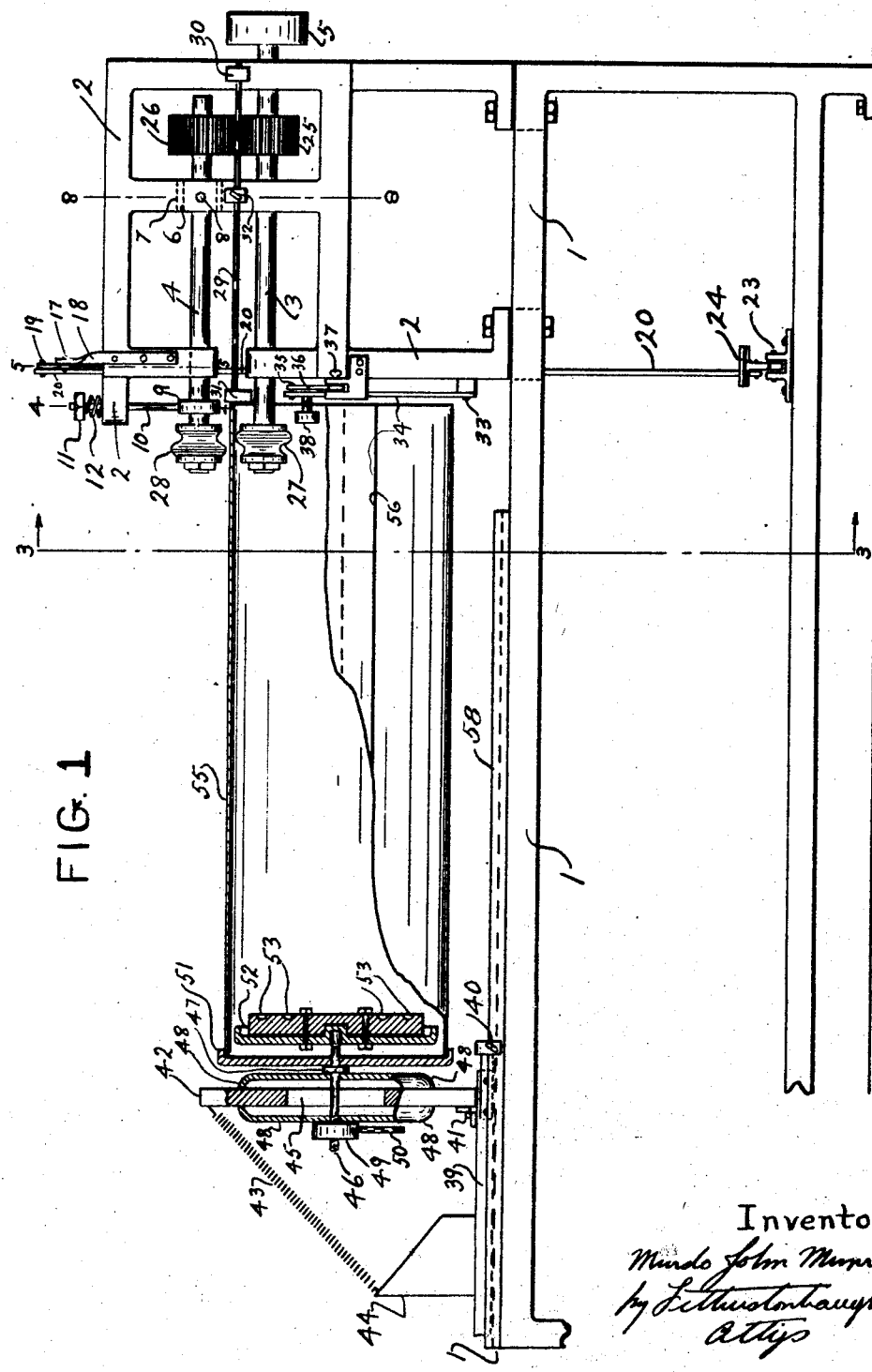

Jan. 5, 1926.

M. J. MUNRO 1,568,906

PIPE MAKING APPARATUS

Filed July 5, 1924

3 Sheets-Sheet 1

Inventor
Murdo John Munro
by Littlestonhaugh&Co
attys

Jan. 5, 1926.  
M. J. MUNRO  
1,568,906
PIPE MAKING APPARATUS
Filed July 5, 1924  3 Sheets-Sheet 2
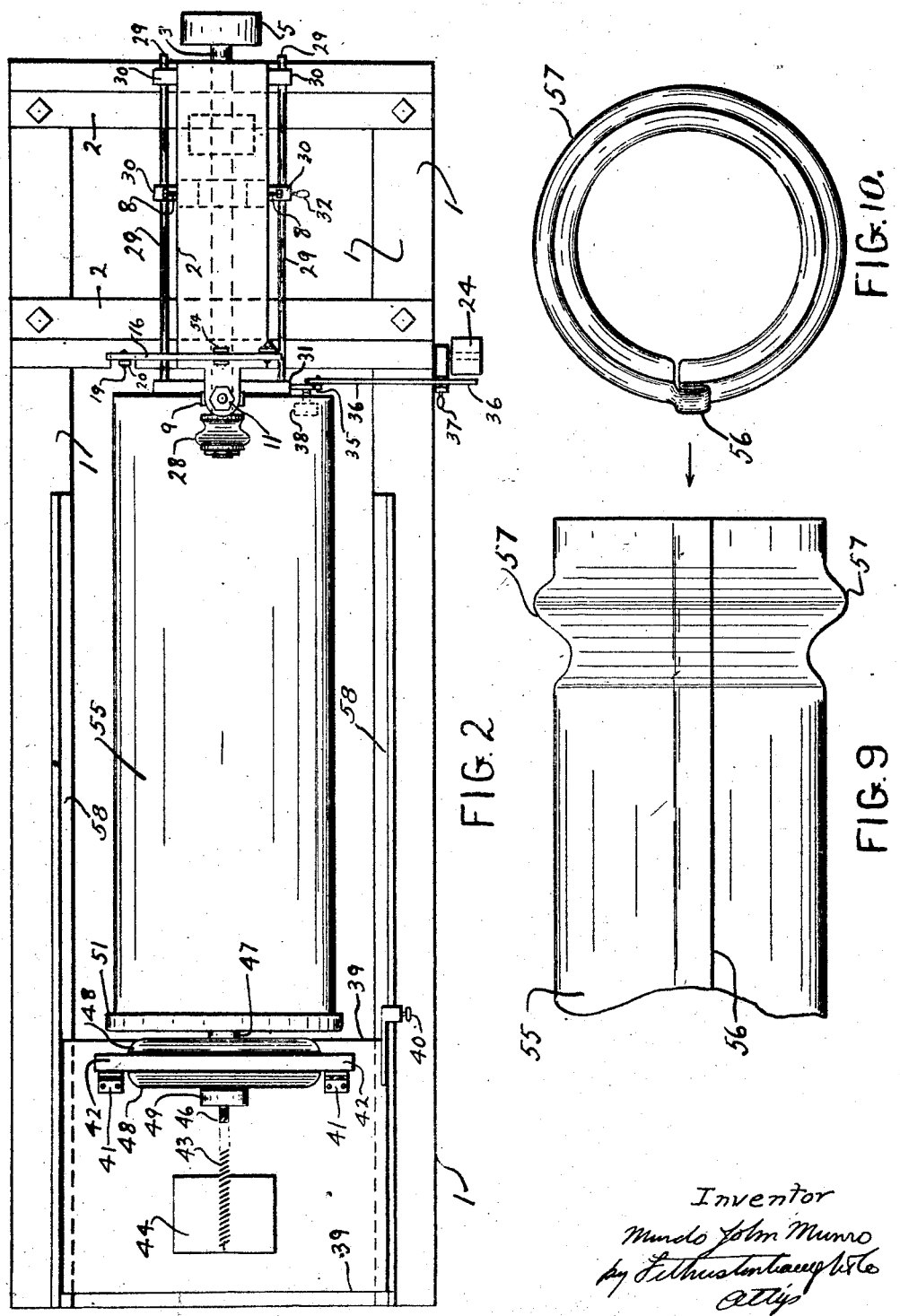
Inventor  
Mundo John Munro  
by Fetherstonhaugh & Co  
attys Jan. 5, 1926. 1,568,906
M. J. MUNRO
PIPE MAKING APPARATUS
Filed July 5, 1924. 3 Sheets-Sheet 3
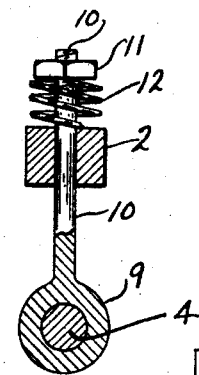
FIG. 4
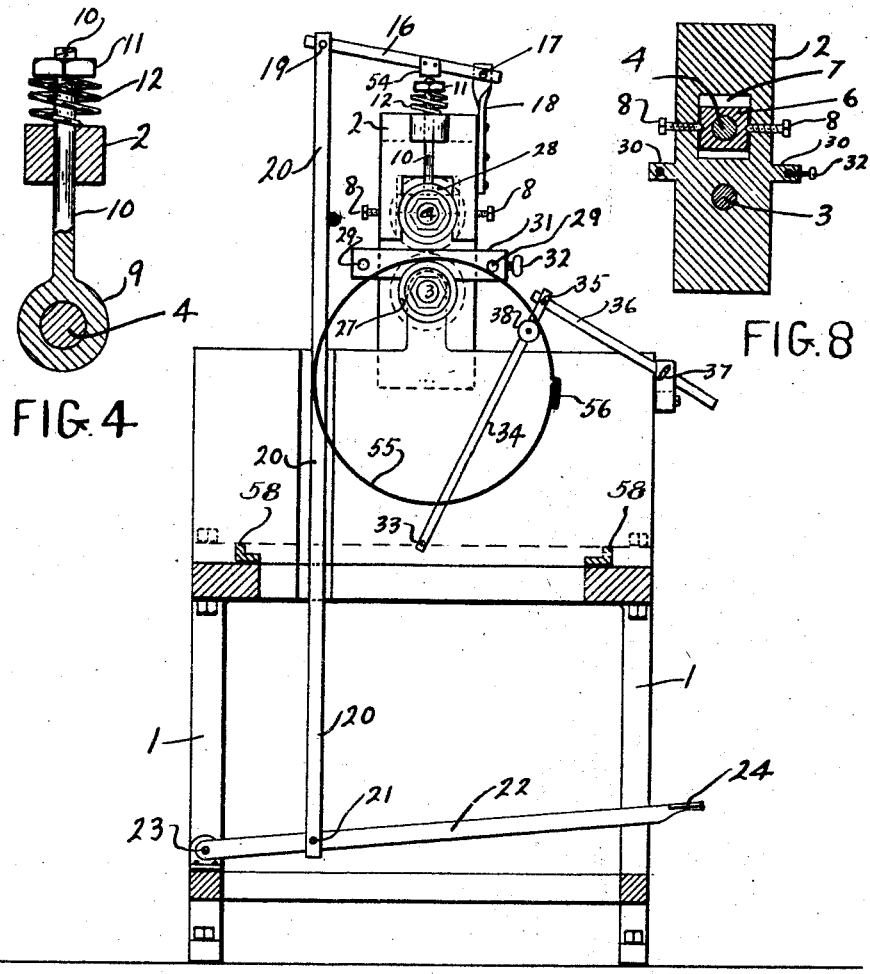
FIG. 3
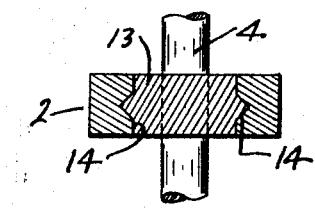
FIG. 8
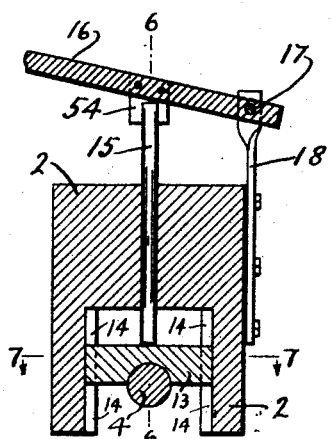
FIG. 5
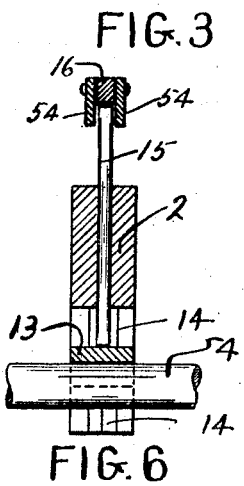
FIG. 6
FIG. 7
Inventor
Murdo John Munro Patented Jan. 5, 1926.

1,568,906

UNITED STATES PATENT OFFICE.

MURDO JOHN MUNRO, OF HAMILTON, ONTARIO, CANADA, ASSIGNOR OF ONE-HALF TO GEORGE ROBERT PETRIE, OF BURLINGTON, CANADA.

PIPE-MAKING APPARATUS.

Application filed July 5, 1924. Serial No. 724,416.

*To all whom it may concern:*

Be it known that I, MURDO JOHN MUNRO, a subject of the King of Great Britain, and a resident of the city of Hamilton, county of Wentworth, Province of Ontario, Dominion of Canada, have invented certain new and useful Improvements in Pipe-Making Apparatus, of which the following is the specification.
My invention relates to improvements in pipe making apparatus with more particular reference to pipes formed from sheet metal, such as stove pipes, and the object of the invention is to devise an improved power-driven beading apparatus, whereby a continuous circumferential bead may be formed around the pipe, thereby producing a pipe of much greater strength and rigidity and of more truly circular form than hitherto, thus permitting the erection of a strictly dust-proof pipe line with no opening at the joints between adjacent pipe lengths; a further object is to enable these pipes to be beaded by power in high speed beading rolls with the minimum of risk to the hands of the operator; a further object is to greatly increase speed of production, thus reducing cost of manufacture; and a still further object is to produce a pipe which may be quickly and conveniently erected thus reducing the cost of installation.

My invention consists of a pipe beading apparatus comprising co-operating rotatable pipe beading rolls adapted to engage the inner and out faces respectively of a pipe to be beaded, provision being made for manipulating these rolls so that they will resiliently grip the pipe therebetween and provision also being made for rotatably supporting the pipe in operative position with respect to the said beading rolls, all as hereinafter more particularly described and illustrated in the accompanying drawings, in which;—

Fig. 1 is a diagrammatic side elevation, partly in section, of my improved apparatus showing a pipe mounted therein in readiness to be beaded, the beading rolls being in the open or non-operative position.
Fig. 2 is a top plan view thereof.
Fig. 3 is a transverse section on the line 3—3 of Fig. 1 looking in the direction of the arrows.

Fig. 4 is a detail section on the line 4—4 of Fig. 1.
Fig. 5 is a detail section on the line 5—5 of Fig. 1.
Fig. 6 is a section on the line 6—6 of Fig. 5.
Fig. 7 is a section on the line 7—7 of Fig. 5 looking in the direction of the arrows.
Fig. 8 is a section on the line 8—8 of Fig. 1.
Fig. 9 is a side elevation of a portion of a pipe as made in my apparatus.
Fig. 10 is an end view of Fig. 9 looking in the direction of the arrow.

In the drawings, like characters of reference indicate corresponding parts in the different views.

My improved apparatus consists of a machine having the main frame 1, which carries at one end the head frame 2 and upon the remainder of which is mounted the angles 58 forming a longitudinal bed upon the frame.

Mounted in the head frame 2 are two substantially parallel, longitudinally disposed shafts 3 and 4. The shaft 3 is supported in fixed bearings in the head frame 2 and carries at its outer end the drive pulley 5.

The shaft 4 is supported intermediately in a bearing block 6 freely mounted within an orifice 7 in the head frame. This bearing block is pivotally mounted in the frame 2 by means of the horizontal pivots 8.

The outer end of the shaft 4 is supported in a bearing collar 9, which collar is suspended from the top of the head frame 2 by a rod 10 which projects upwardly through the head frame and carries at its upper end a nut 11.

Interposed between the nut 11 and the top of the head frame 2 is a spring 12. It will thus be seen that the outer end of the shaft 4 is resiliently supported.

A half bearing block 13 is mounted to slide vertically in guides 14 formed within the head frame 2 (see Figs. 5, 6 and 7), which half bearing block engages the upper half of the shaft 4. An upright rod 15 is slidably mounted within an orifice in the head frame 2 and engages the top of the half bearing block 13 and projects upwardly above the top of the head frame.

A transverse lever 16 has one end pivotally secured at 17 to a post 18 mounted upon the head frame 2 and the outer end pivotally secured at 19 to an upright link 20. Intermediately of its length this lever 16 engages the top of the rod 15 (see Figs. 5 and 6) and at this point depending lugs 54 are secured to the opposite sides thereof.

The lower end of the link 20 is pivotally secured at 21 to a transverse lever 22, the rear end of which is pivotally mounted upon the main frame 1 at 23. The lever 22 projects forwardly of the apparatus and its front end is provided with a foot pedal 24.

The shafts 3 and 4 carry intermeshing gears 25 and 26.

The ends of the shafts 3 and 4 carry cooperating pipe beading rolls 27 and 28 respectively.

Longitudinally disposed rods 29 are slidably mounted in lugs 30 at opposite sides of the head frame 2 and 31 is a guard or stop secured to the ends of these rods.

One of the lugs 30 carries a thumb screw 32 for locking the rods 29 in any desired position.

Pivotally mounted upon the head frame 2 at 33 is a lever 34.

Pivotally secured to the upper end of the lever 34 at 35 is an arm 36 which arm cooperates with a locking thumb screw 37 mounted upon the frame.

Mounted upon the lever 34 is a guide roller 38 the purpose of which will presently appear.

Slidably mounted between the angles 58 is a carriage 39 which may be secured in any desired longitudinal position by a thumb screw 40.

Hingedly mounted at 41 upon the carriage 39 is a member 42 which is normally depressed rearwardly by a spring 43 connecting its upper edge to a block 44 mounted upon the carriage 39.

The member 42 is provided with a comparatively large central orifice 45, the purpose of which will presently appear.

A spindle 46 extends freely through the orifice 45 and is formed intermediately with a collar 47. Mounted upon this spindle 46 are two dished plates 48 which engage opposite faces of the member 42 (see Fig. 1). A nut 49 has threaded engagement upon the spindle 46 and 50 is a handle carried by said nut.

Rotatably mounted upon the opposite end of the spindle 46 is a dished tail-stock 51. Also rotatably and removably mounted upon this end of the spindle 46 is a supplementary tail-stock 52 provided with circular recesses 53 of various diameters in the face thereof, the purpose of which will presently appear.

A sheet metal pipe, such as a stove pipe, having a longitudinal seam 56 is indicated by the numeral 55 and in Figs. 1, 2 and 3 this pipe is shown mounted in the machine in the position ready to be beaded.

In Figs. 9 and 10 the pipe 55 is shown after the beading operation has been completed, the bead being indicated at 57.

The construction and operation of my invention is as follows:—

Normally the beading rolls 27 and 28 are held separated by the spring 12 which holds the end of the shaft 4 and with it the roll 28 in its fully raised position out of operative connection with the roll 27.

When it is desired to bead the pipe, the pipe 55 is mounted in the machine as shown in Figs. 1, 2 and 3, the tail-stock being adjusted vertically to align it correctly in the machine for the particular size of pipe.

From the drawings it will be noted that the lever 34 is mounted for oscillation about an axis parallel to the axis of the beading roll 27 and that the guide roller 38 engages the inner face of the pipe adjacent to this roll.

The lever 34 is adjusted inwardly or outwardly as required so that the pipe 55 is drawn laterally slightly from its normal central position in the machine. The purpose of this will be presently explained.

It will also be observed that, because of the enlarged orifice 45 in the member 42, the tail-stock 51 may be adjusted in any direction perpendicular to its axis of rotation.

This adjustment of the tail-stock is now made so that the axis of the pipe 55 is parallel with the axis of the beading roll 27, such adjustment being made necessary to compensate for the displacement of the pipe laterally by the guide roller 38 above mentioned.

The rolls 27 and 28 are rotated from the pulley 5 through the gears 25 and 26 and by depressing the foot pedal 24 the forward end of the shaft 4 is forced downwardly through the medium of the rod 20, lever 16, rod 15 and half bearing block 13.

This brings the rolls 27 and 28 into their operative position in which the roll 27 engages the inner face of the pipe and the roll 28 the outer face, the pipe being resiliently gripped between the rolls.

This resilient grip of the pipe between the beading rolls is a most important feature of my invention as it enables a continuous bead to be formed upon the pipe so that the bead is formed in the seam as well as in the remainder of the pipe. This can not be done unless the grip of the pipe between the rolls is resilient. The resilient grip takes care of the increased thickness of the pipe at the seam 56.

The adjustable guide roller 38 and the adjustable tail-stock 51 are also important features since these adjustments prevent lashing of the pipe when rotating at high speed. Unless the pipe can be rotated at high speed without lashing the machine will not operate successfully.

The guide roller 38 engages the inner face of the pipe adjacent to the roll 27 and distorts or displaces the pipe laterally outward just before it enters the rolls. This roller is adjustable to take care of different size of pipe and various pre-determined settings could be arranged to suit various pipe sizes.

The shaft 4 must be provided with a pivoted bearing such as shown at 6 in order to permit operation and this would be so arranged that the gear 26 will remain in mesh with the gear 25 throughout the entire movement of the shaft 4. It will be understood that the vertical movement of the roll 28 is very small so that the shafts 3 and 4 are substantially parallel at all times.

The stop 31 may be adjusted longitudinally and positioned at any point to locate the bead at the desired position on the pipe, the end of the pipe being brought up against the face of the stop 31.

In the operation of beading a pipe the tail-stock 51 is held in engagement with the end of the pipe by holding the member 42 raised into the position illustrated in Fig. 1.

The operation of the supplementary tail-stock 52 will be evident and this would only be used in place of the regular tail-stock 51 as required to fit various sizes of pipe.

The tail-stocks 51 and 52 might for convenience be constructed as a single unit.

Hitherto the bead on pipes of this type has been performed on hand machines, one of the chief reasons why power has not been used being that it has been considered impracticable to bead pipe at high speed on account of the danger to the hands of the operator, from the lashing of the free end of the pipe. This lashing has been entirely overcome in my apparatus and the pipe may be beaded at very high speeds.

On machines as used hitherto the grip of the rolls upon the pipe has not been resilient and it has therefore been impossible to form a continuous bead about the pipe. The bead stopped at and did not extend over the seam.

By providing a continuous bead a very much stronger and more rigid pipe may be obtained than is possible when the bead is discontinued at the seam. Also with a continuous bead, an absolutely round pipe is assured which is impossible with the discontinuous bead due to there being always, of necessity, in the latter case a distorted portion at the seam.

Further, with a pipe having a continuous bead there is no opening at the seam between adjacent pipe lengths when connected and therefore the pipe line is strictly dust-proof, whereas with the discontinuous bead there is always a longitudinal opening at the seam between adjacent pipe lengths.

The value of a truly round and uniform pipe will be realized when considering the cost of erection.

With the ordinary pipe having a discontinuous bead and which is never truly round the fitting of the various lengths together is extremely troublesome and inconvenient and it is necessary that each pipe be first sprung by hand in order to make it fit the end of the adjacent pipe.

With a truly round pipe as produced on my apparatus no such springing will be required and the pipes may be much more conveniently and rapidly erected.

A further advantage of a pipe which is of standard diameter and truly round is that the fitting of dampers is greatly facilitated, as a damper may be fitted into any section of pipe with the assurance that it will swing freely therein. This is not the case with ordinary stove pipe which is not truly round and it is frequently necessary for the workman to try the damper in a considerable number of pipe sections before one is found in which it will swing freely.

From the foregoing it will be apparent that I have devised valuable improvements in apparatus of the class described which will not only produce a much superior pipe but which will enable a very great reduction to be made in the cost both of manufacture and erection.

Various modifications may be made in my invention without departing from the spirit thereof or the scope of the claims and therefore the exact forms shown are to be taken as illustrative only and not in a limiting sense, and I desire therefore, that only such limitations shall be placed thereon as are imposed by the prior art or are specifically set forth in the appended claims.

What I claim as my invention is:

1. In pipe beading apparatus, the combination with the main frame of the apparatus, of co-operating rotatable pipe beading rolls mounted therein and adapted to engage the inner and outer faces respectively of a pipe to be beaded, means for rotatably supporting the pipe substantially parallel with the axes of the rolls, a lever pivotally mounted upon the frame for oscillation about an axis parallel to that of the beading rolls, a guide roller carried by the lever and adapted to engage the inner face of the pipe adjacent to the corresponding beading roll, and positioning means for said lever.

2. In pipe beading apparatus, the combination with the main frame of the apparatus, of co-operating rotatable pipe beading rolls mounted therein and adapted to engage the inner and outer faces respectively of a pipe to be beaded adjacent to one end thereof, a lever pivotally mounted upon the frame for oscillation about an axis parallel to that of the beading rolls, a guide roller carried by said lever and adapted to engage the inner face of the pipe adjacent to the corresponding beading roll, positioning means for said lever, a tail-stock mounted upon the frame and rotatably supporting the opposite end of the pipe, and means for adjusting the tail-stock perpendicularly to the axis of rotation.

3. In pipe beading apparatus, the combination with the main frame of the apparatus, of co-operating rotatable pipe beading rolls mounted therein, a guide roller supported by the frame adjacent to the beading rolls, means for adjusting said guide roller perpendicularly to the axes of the beading rolls, a tail-stock mounted upon the frame in spaced relation in front of the beading rolls and rotatable about an axis parallel to that of the beading rolls, and means for adjusting the position of the tail-stock perpendicularly to its axis of rotation.

MURDO JOHN MUNRO.